June 11, 1940.  L. P. VAN DER ESSEN  2,203,804
METHOD OF AND APPARATUS FOR PRODUCING CRINKLED SILKING
Filed Aug. 11, 1936  4 Sheets-Sheet 1

INVENTOR
Louis P. Van der Essen
BY
ATTORNEY

June 11, 1940.  L. P. VAN DER ESSEN  2,203,804
METHOD OF AND APPARATUS FOR PRODUCING CRINKLED SILKING
Filed Aug. 11, 1936 4 Sheets-Sheet 2
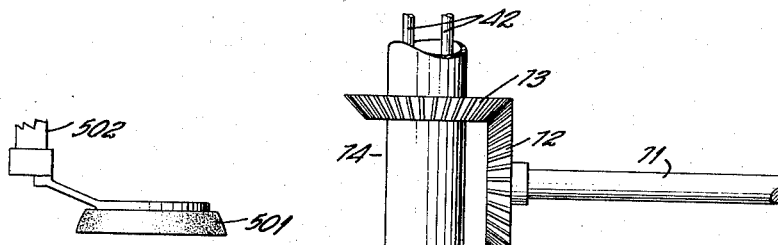
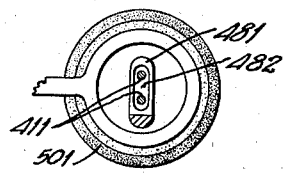
FIG.4
FIG.3
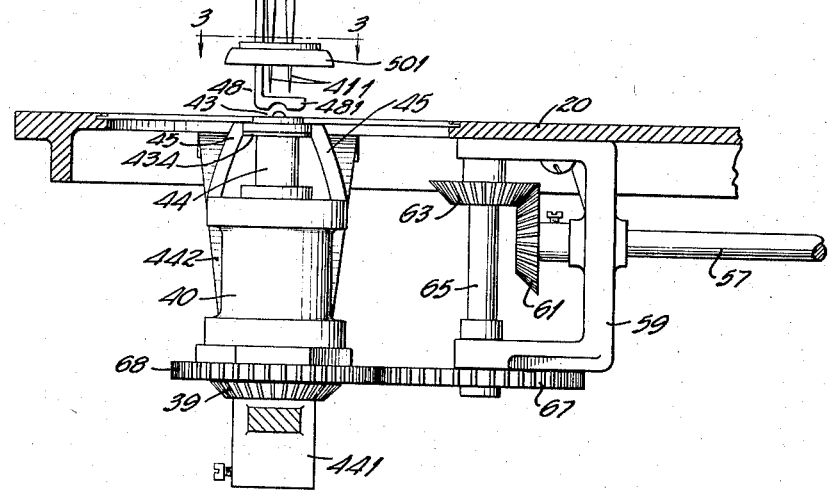
FIG.2
INVENTOR
Louis P. Van der Essen
By Daniel L. Wood
ATTORNEY

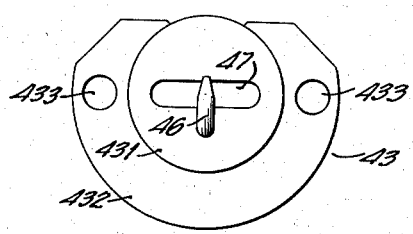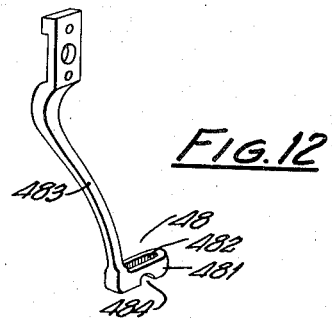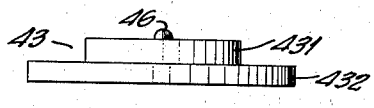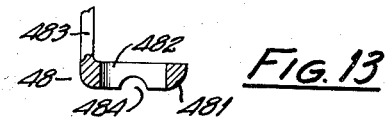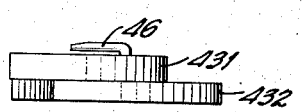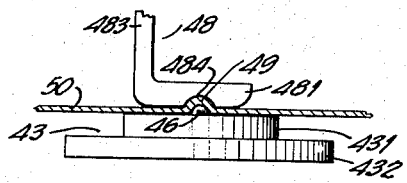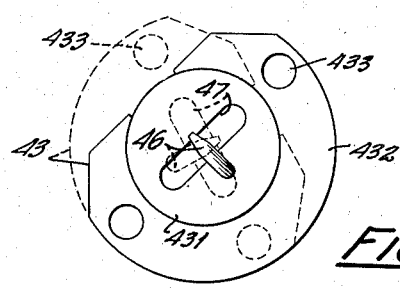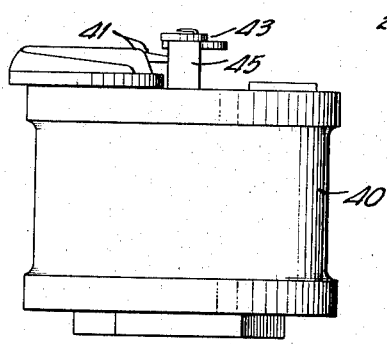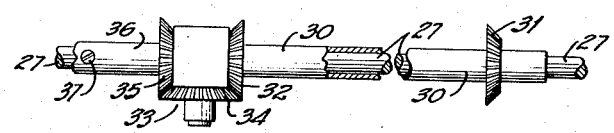

June 11, 1940.  L. P. VAN DER ESSEN  2,203,804
METHOD OF AND APPARATUS FOR PRODUCING CRINKLED SILKING
Filed Aug. 11, 1936  4 Sheets—Sheet 4

INVENTOR
Louis P. Van der Essen
By Daniel L. Wood
ATTORNEY

Patented June 11, 1940

2,203,804

UNITED STATES PATENT OFFICE 2,203,804

METHOD OF AND APPARATUS FOR PRODUCING CRINKLED SILKING

Louis P. Van der Essen, Gloversville, N. Y.

Application August 11, 1936, Serial No. 95,436

8 Claims. (Cl. 112—98)

In the manufacture of gloves it has been common to ornament the back thereof by producing silking thereon. Such silking comprises straight ribs or ridges formed on the back of the glove and which are stitched on opposite sides of the ribs.

The ornamental effect of the silking is greatly enhanced by making the same sinuous in form or what is known in the art as "crinkled" or "corkscrew." Hitherto, such crinkled appearance has been produced either by hand stitching or by the use of a cord which is fed to the work on the side thereof which becomes the inside of the glove as the stitching operation is being carried out and which serves to retain the ridge in the glove. In the first method, the leather or other material from which the glove or other article is formed is pierced with two rows of openings arranged in staggered relation, and a single thread is then threaded through the two series of openings and when placed under tension produces a rib in the material. This process, however, is necessarily slow and therefore expensive. Furthermore, the silking is unsatisfactory for the reason that a strain placed on the material transversely of the general direction of the ribs, such as is produced when the glove is drawn onto the hand, tends to straighten the thread and remove the rib thereby destroying the very appearance which it was intended to produce.

In order to overcome the foregoing difficulties in crinkled silking produced manually, silking has been produced mechanically by stitching the back of the glove. The rib, however, was produced by feeding a cord to the work while the stitching operation was being carried out and the machine was provided with mechanism by which the bends were produced in the rib which gave to it the crinkled or corkscrew effect. Machine-made silking of this character, however, is unsatisfactory for the reason that the rib in the material is formed by the cord and is not as pronounced as it is where the rib is formed by the stitching and for the further reason that the white cord or cord having a color differing from that of the material of which the back of the glove is formed is visible through the openings formed by the stitching, thus presenting an unsightly, objectionable appearance. Furthermore, the rib has no "give" in the direction of the cord and is objectionable for this reason. Again, the presence of the cord renders the portion of the glove to which the silking is applied stiff and less flexible than the remainder of the glove which is, of course, objectionable. Furthermore, the expense of the cord adds to that extent to the cost of the glove, and it is well known that a slight variation in the cost of the glove may control the commercial use thereof.

In accordance with my invention, silking is produced by my method and on a machine without the use of a cord and which simulates the hand-made silking, but which is superior thereto for the reason that strains either transverse or longitudinally of the ribs do not mar their appearance.

In accordance with my invention, the rib is pressed into the material of which the glove is made preferably by the use of dies, and preferably simultaneously with the formation of the rib the material is stitched on each side of the rib, the stitching thereby serving to confine the rib and prevent the deformation thereof under the strains incident to the use of the glove.

Silking of the character above referred to is commonly used on the backs of gloves, and I have, therefore, illustrated my invention in connection with the glove backs. It will, however, be understood that my invention is applicable to any flexible material where the same effect might be desirable. Furthermore, while I have particularly indicated leather as a flexible material suitable for use in carrying out my invention it will be understood that the silking embodying my invention is also applicable to other materials such as silk, cotton cloth or wool.

My invention will best be understood by reference to the accompanying drawings in which I have illustrated the preferred form of apparatus for carrying out my invention and the preferred form of article produced thereby and in which Fig. 1 is a sectional elevation through an apparatus embodying my invention;

Fig. 2 is a sectional front elevation of the needle operating mechanism and the associated parts and the oscillating member which cooperates with the needles and the operating mechanism therefor;

Fig. 3 is a sectional plan view taken along the line 3—3 in Fig. 2;

Fig. 4 is a side view of Fig. 3;

Fig. 5 is a fragmentary side view, partially in section, of a portion of the drive shaft, the sleeve thereon and the associated parts;

Fig. 6 is a side view of the member which cooperates with the needles in the formation of the stitches;

Fig. 7 is a plan view of the element which cooperates with the needles in the formation of the stitches;

Fig. 8 is a view generally similar to Fig. 7 and illustrating in full and in dotted lines the two different positions of the slotted element through which the needles pass;

Fig. 9 is a side view of the element shown in Fig. 7;

Fig. 10 is a front view at right angles to Fig. 9;

Fig. 11 is a front view showing the presser foot and the associated oscillatable element and a section of work between the two;

Fig. 12 is a perspective view of the presser foot and the supporting bar therefor;

Fig. 13 is a vertical section through the presser foot;

Fig. 14 is a sectional plan view of the presser foot;

Like reference characters indicate like parts throughout the drawings.

While the method embodying my invention is capable of being carried out by hand, it may, with modifications be carried out on a machine which has been used for making corded silking of the character above referred to. Such a machine is known in the art and I have, therefore, omitted many of those details of the machine which are the same as those of the known machine and which constitute no part of my invention.

Figures 1, 1A:
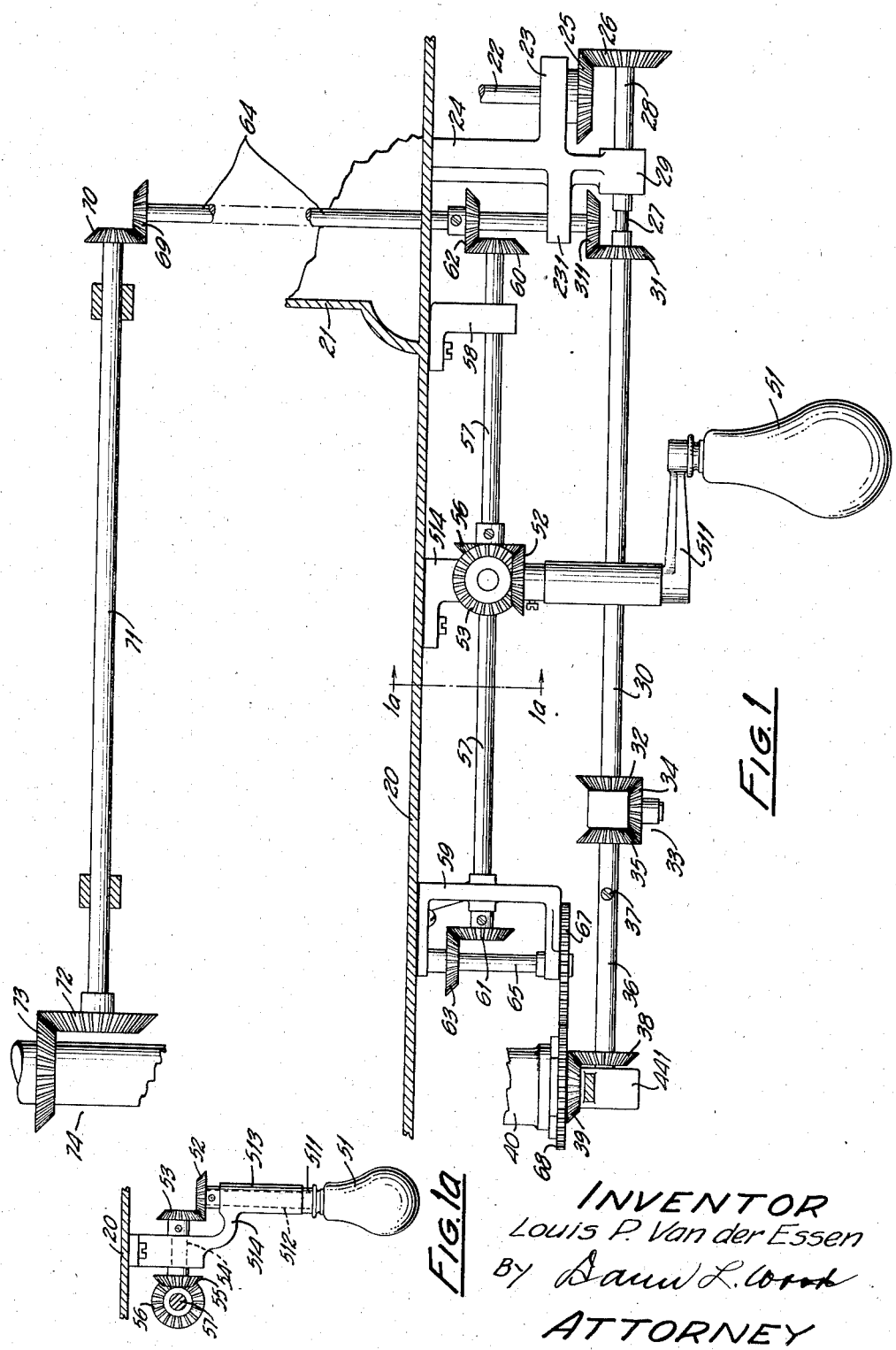
Fig. 1a is a sectional elevation taken along the plane of the line 1a—1a of Fig. 1.

Referring to the drawings, 20 is a table on which the machine is mounted and on which is mounted the usual sewing machine head a portion of which is shown at 21 (Fig. 1). The main drive shaft 22 may be driven from any suitable source of power and has its bearing in an arm 23 extending laterally from a bracket 24 which may, in turn, be supported from the table of the machine. On the lower end of the shaft 22 is mounted a bevel gear 25 which meshes with a bevel gear 26 secured on a shaft 27 through which the hook for the shuttle of the machine is operated. The end of the shaft adjacent to the bevel gear 26 is preferably surrounded by a spacing sleeve 28 surrounding shaft 27.

A second sleeve 30 surrounds the shaft 27 and to the respective ends thereof are secured bevel gears 31 and 32, the latter forming one of the main gears of a differential gear indicated generally at 33. The planetary gear of the said differential gear is indicated at 34 and the other main gear of the differential at 35. The planetary gear 34 is secured to the shaft 27 by a set screw (not shown). A third sleeve 36 also surrounds the shaft 27 and is provided with a screw normally closing an opening in the shaft which may be used for oiling purposes.

The drive shaft 27 thus passes through the sleeve 30, differential and sleeve 36 and drives the planetary gear 34 which normally rotates about the bevel gear 32 which normally remains stationary as does the sleeve 30 to one end of which the gear 32 is secured. The planetary movement of the gear 34 thus rotates bevel gear 35, sleeve 36 and bevel gear 38. The bevel gear 38 meshes with a bevel gear 39 which is mounted on a rotatable element (not illustrated) within the head 40 and on which is mounted the hook 41 for the shuttle, which hook is thus continuously rotated from the said drive shaft, it being understood that the shuttle is stationary, as is the bobbin which is mounted therein and on which the shuttle thread is wound as is well known.

Referring more particularly to Fig. 2, the needles 411 are mounted in suitable needle guides (not illustrated) and are reciprocated by mechanism (not illustrated) from the arm shaft of the machine in the manner usual in sewing machines. In order to form a rib or ridge in the work and which is known in the art as silking, a male and a female die are provided between which the work passes. The male die which is indicated generally at 43 comprises a plate 431 over which the work passes and also comprises an attaching plate 432 (preferably integral with the plate 431) provided with openings 433 by which the member 43 may be secured to a plate 434 (Fig. 2) with which the top of a shaft 44 is provided. The shaft 44 extends upwardly within the head 40 and has its bearing at 441, the bearing being supported on a bracket 442 attached to the table 20. The plate 432 is preferably engaged on opposite edges by arms 45 extending upwardly from the head 40 (Fig. 2). A rib or finger 46 is mounted on and is preferably integral with said plate 431 and extends above and across a slot or elongated opening 47 formed therein as best indicated in Figs. 7 and 10.

The female die indicated generally at 48, comprises a presser foot 481 formed with a slot 482 through which the needles pass. The presser foot is secured to the needle head by an arm 483. The lower side of the presser foot is provided with a groove 484 and when forced downwardly by suitable mechanism (not shown) registers with the rib 46 and forms a rib or ridge 49 in the work material 50 which is fed between the two. A presser foot 501 feeds the work in the usual manner. It will, of course, be understood that sufficient pressure is applied to the presser foot to form a satisfactory rib in the material.

In order to make the rib in the work crinkled or sinuous in form, means are provided for oscillating the plate 431 and the rib 46 thereon and also oscillating the needles in synchronism therewith. In the embodiment of my invention illustrated, a manually operated handle 51 is mounted on an arm 511 secured to a shaft 512 having its bearing in a sleeve 513 mounted on and preferably integral with a bracket 514 suitably secured to the under side of table 20. On the upper end of the shaft 512 is mounted a bevel gear 52 meshing with a bevel gear 53 which is, in turn, mounted on one end of a horizontally extending shaft 54 having its bearing in the bracket 514. On the opposite end of the shaft 54 is mounted a bevel gear 55 meshing with a bevel gear 56 which is secured to a shaft 57 having its bearings in brackets 58 and 59 secured to the under side of the table 20. Secured to the respective ends of the shaft 57 are bevel gears 60 and 61 meshing, respectively, with bevel gears 62 and 63 the first of which is secured to a shaft 64 extending upwardly within the head 21 of the machine and the second of which is secured to a shaft 65 having its bearings in the arms of a yoke shaped bracket 59 secured to the under side of the table 20. To the lower end of the shaft 65 is secured a gear wheel 67 meshing with a gear wheel 68 secured to and oscillatable with the shaft 44.

To the upper end of the shaft 64 is secured a bevel gear 69 meshing with a bevel gear 70 secured on one end of a horizontally extending shaft 71 and to the opposite end of which is secured a bevel gear 72 meshing with a bevel gear 73 secured to an oscillatable element indicated generally at 74 and which is preferably mounted on a part of the head 21 of the machine as best indicated in Fig. 2. The lower end of the shaft 64 has its bearing in an arm 231 on bracket 24 and to the lower end of the shaft is secured a bevel gear 311 meshing with the bevel gear 31. Threads 42 are led through the needle head 74 to the respective needles 411.

Figure 15:
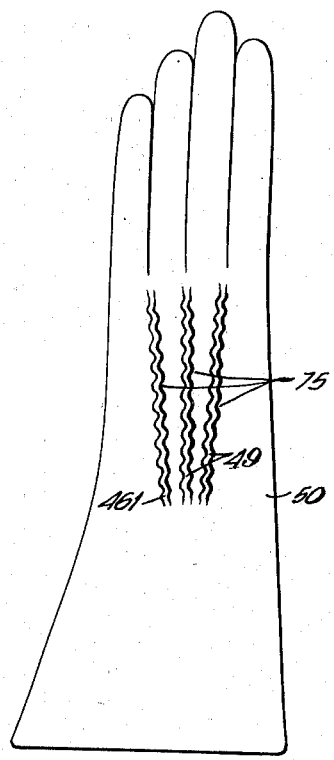
Fig. 15 is a plan view of the back of a glove illustrating silking embodying my invention applied to the back thereof.
Figure 18:
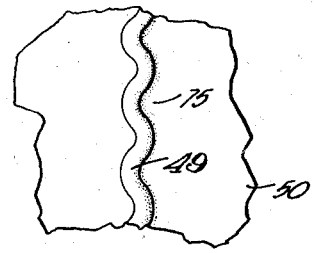
Fig. 18 is a view similar to Fig. 16 but showing the silking somewhat deformed.
Figure 16:
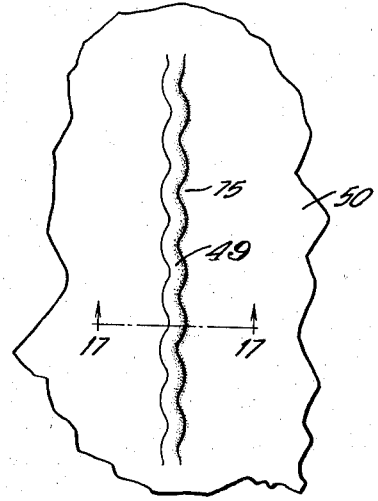
Fig. 16 is a fragmentary plan view of a piece of material illustrating a single line of silking embodying my invention applied thereto.
Figure 17:
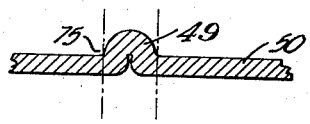
Fig. 17 is a section taken along the plane of the line 17—17 of Fig. 16.

The crinkled formation of the rib in the material is indicated at 75 in Figs. 15, 16 and 17.

The operation of the device embodying my invention is as follows:

The work material 50 is placed between the presser foot 481 and the plate 431 and is then moved forwardly by the feet mechanism in the manner usual in sewing machines. The foot 501 which is supported on an arm 502 is brought into engagement with the work to hold the same in position. The rib 46 on the plate 431 presses the material 50 upwardly into the groove 484 of the presser foot to form a rib 49 in the material. The reciprocation of the needles 411 causes them to pass downwardly through the slot 482 formed in the presser foot, then through the material 50 on opposite sides of the rib 46 and through the slot 47 to the space beneath where loops are formed in the respective needle threads as the needles begin to ascend, which loops are caught by the rotating hook which passes the same aroound the stationary shuttle to form lock stitches on opposite sides of the rib 49 in the material.

The rotation of the shaft 27 normally rotates the planetary gear 34 which is secured thereto. The sleeve 30 and the bevel gears 31 and 32 which are secured thereto is at this time stationary. The planetary gear 34, therefore, spins around the bevel gear 32 and rotates gear 35, sleeve 36, gear 38 and bevel gear 39 which drives the hook for the stitches. The cork screw or crinkled form is imparted to the rib by oscillating the handle 51 which, through the described gearing, oscillates the shaft 57. The oscillation of the shaft 57 through the bevel gear 60 and associated parts oscillates the element 74 and the needles and through the bevel gear 61 and the associated parts including the bevel gear 63, shaft 65 and gears 67 and 68 oscillated thereby causing the plane of the needles to include the longer axis of the slot 47. The needles thus always pass downwardly on opposite sides of the rib 46 and the plane of the needles is maintained at right angles to the rib 46. The thread forming the stitches on opposite sides of the rib, is kept under sufficient tension by mechanism well known for maintaining the rib in the material after it has left the dies. When the shaft 57 is oscillated due to the oscillation of the handle 51, the gear 60 which is mounted on said shaft oscillates the shaft 64, the gear 311 which is mounted on the lower end thereof, the sleeve 30 and the gear 32 which causes the planetary gear 34 to rotate the gear 35, bevel gear 38 and bevel gear 39 and advance or retard the rotation of the hook 41 so that it is kept in step with the element 43.

By forming the separate stitches with separate threads instead of with a single thread as has heretofore been common in hand stitching, any transverse strains to which the gloves or other article to which the silking is applied are subjected does not destroy the ribs as has been the case with hand stitched gloves. Furthermore, there is a certain amount of "give" longitudinally of the ribs in the material which is not present in gloves formed with corded ribs.

Hence, while I have described my invention in its preferred embodiments, it is to be understood that the words which I have used are words of description and not of limitation. Hence, changes within the purview of the appended claims may be made without departing from the true scope and spirit of my invention in its broader aspects.

What I claim is:

1. In a device for forming and maintaining a crinkled rib in flexible material, cooperating male and female dies disposed on opposite sides of said material for forming a rib therein, means for stitching the material on opposite sides of said rib, and means for oscillating said dies during the formation of the rib.

2. In a device for forming and maintaining a crinkled rib in flexible material, cooperating male and female dies disposed on opposite sides of said material for forming a rib therein, means for stitching the material on opposite sides of said rib and with separate threads, and means for oscillating said dies during the formation of the rib.

3. In a device for forming and maintaining a crinkled rib in flexible material, cooperating male and female dies disposed on opposite sides of said material for forming a rib therein, means for stitching the material on opposite sides of said rib, means for oscillating said dies during the formation of the rib, and means for maintaining sufficient tension in the thread forming the stitches to maintain the said ribs after leaving the dies.

4. In a device for forming and maintaining a crinkled rib in flexible material, an element provided with a slot and with a rib or finger extending above and across said slot and forming a male die, a female die cooperating therewith, means for feeding flexible material between said dies and under sufficient pressure to form a rib therein, means for forming stitches on opposite sides of the rib in said material, and means for oscillating said dies during the formation of said rib.

5. In a device for forming and maintaining a crinkled rib in flexible material, an element provided with a slot and with a rib extending above and across said slot and forming a male die, a presser foot provided on its lower side with a groove registering with said rib and forming a female die, means for feeding flexible material between said dies, and means for oscillating said dies during the formation of said rib.

6. In a device for forming and maintaining a crinkled rib in flexible material comprising cooperating male and female dies between which the said material passes, two reciprocating needles carrying respective threads through the material on opposite sides of said rib and forming loops therein beneath the material, a single movable hook associated with a single shuttle beneath said material and cooperating with the loops formed in the needle threads to form two series of lock stitches on opposite sides of said rib, and means for oscillating said dies and said needles during the formation of the rib.

7. In a device for forming and maintaining a crinkled rib in flexible material, cooperating male and female dies disposed on opposite sides of said material for forming a rib therein, means for oscillating said dies during the formation of said rib, means for stitching said material on opposite sides of said rib comprising two needles for carrying separate threads through said material on opposite sides of said rib, a rotating element for interlocking a single shuttle thread with said needle threads to form lock stitches, and means for correcting the movement of said rotating element to maintain the same in step with said oscillating means.

8. A method of sewing which consists in forming stitches by means of a pair of needles which are given a predetermined work-piercing movement, while producing a relative shift between the work and the needles so that the stitches are formed in a non-rectilinear path, producing a bight in the work during the stitching operation, and forming the stitches at opposite sides of the peak of said bight so as to produce an upstanding rib in the work between the stitches.

LOUIS P. VAN der ESSEN.